(No Model.)

V. M. CHAFEE.
WHEEL FOR HARVESTERS.

No. 264,513. Patented Sept. 19, 1882.

Attest:
F. M. Burnham.
Chas. F. Benjamin.

Inventor:
Vosco M. Chafee,
By William Conard,
Attorney.

UNITED STATES PATENT OFFICE.

VASCO M. CHAFEE, OF CLAY CITY, ILLINOIS.

WHEEL FOR HARVESTERS.

SPECIFICATION forming part of Letters Patent No. 264,513, dated September 19, 1882.

Application filed June 28, 1882. (No model.)

*To all whom it may concern:*

Be it known that I, VASCO M. CHAFEE, a citizen of the United States, residing at Clay City, in the county of Clay and State of Illinois, have invented certain new and useful Improvements in Wheels for Harvesters, Road-Engines, and Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to the wheels of engines, machines, or heavy vehicles, and its object is to prevent their sinking too deeply into soft or muddy soil. This object I accomplish by means of what may be called a "mud-rim" attached temporarily to such wheels.

Figure 1:
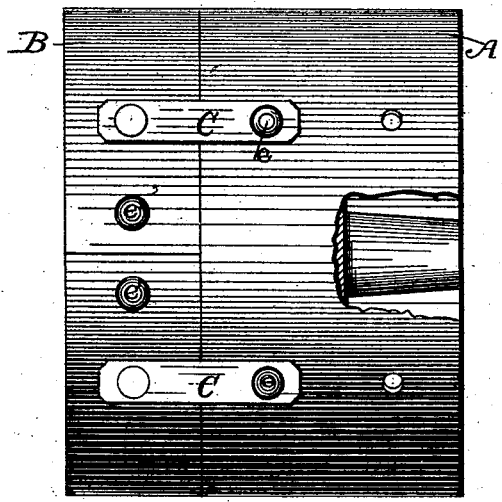
Figure 2:
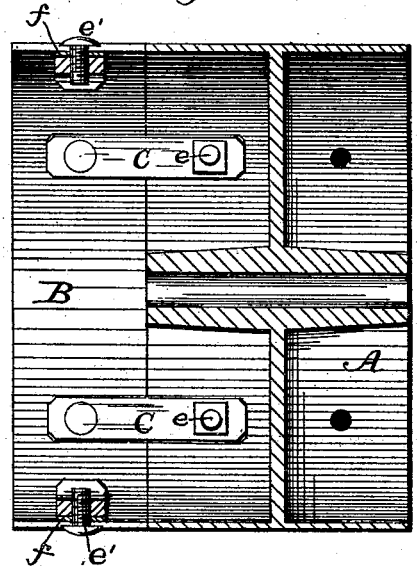
Figure 3:
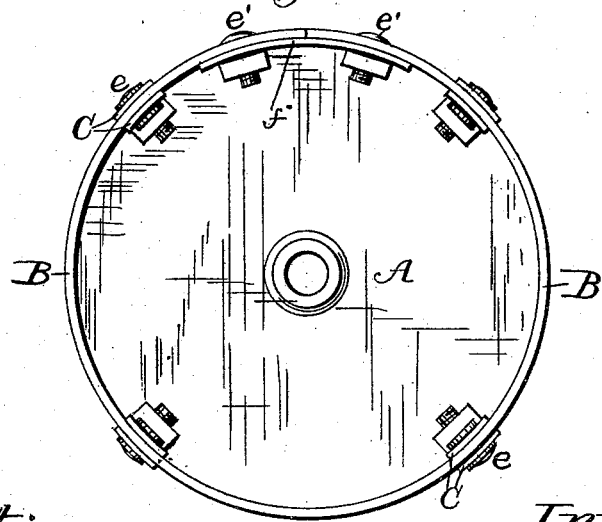

In the accompanying drawings, Figure 1 represents a sectional view of the exterior of the carrying-wheel of a harvesting-machine with mud-rim attached; Fig. 2, an interior section of the same, and Fig. 3 a plan view of the same from the exterior edge of the mud-rim.

Like letters describe like parts in the series of drawings.

A is the rim or tread or tire of a wheel. B is a strip of iron or other metal, bent to a circle of the same outside circumference as the wheel, and attached thereto by means of the clamps C C, which are riveted fast to the mud-rim B, and secured as needed to the rim of the wheel A by bolts and screw-nuts $e$ $e$. These clamps C C are provided on both the inner and outer surfaces of the rim B, and are bolted upon both the inner and outer surfaces of the rim or tread or circle of the permanent wheel A, the clamps outside and inside being arranged in pairs, so that one rivet or bolt holds the inner and outer clamps of a pair. A fish-plate, $f$, secures the two ends of the rim B together, this plate being attached to that rim by nuts and screw-bolts $e'$ $e'$. When the rim B is made in one complete circle, as in Fig. 3, only one fish-plate is necessary; but when, for sake of economy or convenience, the round rim B is made in sections there must be a fish-plate $f$ to each joint, as in Fig. 2.

Mud-rims may be attached sometimes to both edges of a permanent wheel, as intimated, by the bolt-holes bored toward both edges of A in Figs. 1 and 2.

It is evident that my mud-rim and its accessories can be made in any country smithy, and attached and detached to and from a permanent wheel by any person capable of driving a wagon or operating a reaping or mowing machine. The utility of it is also apparent. Harvesting-machines are prevented from working altogether when they sink too deeply into the soil, and roads are injured and the inertia of vehicles and machines traveling them increased by the sinking of the wheels. By temporarily broadening the tread of a wheel when the surface of the ground is soft this sinking is prevented or lessened, and when a hard surface is regained the weight and traction of the mud-rim is removed by detaching it from the wheel and putting it away.

Having thus described my invention, what I claim as new and useful, and desire to secure by Letters Patent, is—

1. The method of temporarily broadening the tread of carrying or driving wheels of harvesters, road-engines, and vehicles to prevent undue sinking in the soil or road-bed by attaching to the edge or edges of such wheels circular bands or rims of metal of the same exterior circumference as said wheels, all substantially as and for the purposes described.

2. In wheels for harvesters, road-engines, and heavy vehicles of all sorts, a mud-rim consisting of a metal strip or band bent to a circle and attached to the outer or inner edge, or both edges, of a driving or carrying wheel by means of clamps, rivets, screw-bolts, nuts, and fish-plates, or other strictly equivalent devices, all substantially as and for the purposes described.

3. In carrying or driving wheels, flat metal clamps, arms, or lugs, with rivets, screw-bolts, and nuts, as a means of temporarily attaching two wheels of equal circumference together, substantially as described, for the purpose of operating the two wheels as one and getting an increased bearing or traction surface.

In testimony whereof I affix my signature in presence of two witnesses.

VASCO M. CHAFEE.

Witnesses:
SAMUEL W. KENNEDY,
JABEZ COGGAN.